United States Patent
Seils

[11] Patent Number: 6,098,760
[45] Date of Patent: Aug. 8, 2000

[54] BRAKE APPARATUS FOR VEHICLES

[75] Inventor: Wolfgang Seils, Ludwigsburg, Germany

[73] Assignee: Robert Bosch GmbH, Stuttgart, Germany

[21] Appl. No.: 09/125,353
[22] PCT Filed: Dec. 4, 1996
[86] PCT No.: PCT/DE96/02317
  § 371 Date: Aug. 17, 1998
  § 102(e) Date: Aug. 17, 1998
[87] PCT Pub. No.: WO97/29937
  PCT Pub. Date: Aug. 21, 1997

[30] Foreign Application Priority Data

Feb. 17, 1996 [DE] Germany ............................ 196 05 987

[51] Int. Cl.[7] ..................................................... B60T 8/52
[52] U.S. Cl. .............................. 188/1.11 E; 188/1.11 R; 188/181 T
[58] Field of Search ........................ 188/1.11 R, 1.11 E, 188/1.11 W, 1.11 L, 181 T, 325, 340

[56] References Cited

U.S. PATENT DOCUMENTS

| | | | |
|---|---|---|---|
| 4,615,419 | 10/1986 | Gaiser | 188/181 T |
| 4,716,994 | 1/1988 | Iwamoto | 188/1.11 E |
| 5,279,394 | 1/1994 | Wollenweber et al. | 188/1.11 E |
| 5,582,275 | 12/1996 | Arnold | 188/164 |

*Primary Examiner*—Matthew C. Graham
*Assistant Examiner*—Devon Kramer
*Attorney, Agent, or Firm*—Edwin E. Greigg; Ronald E. Greigg

[57] ABSTRACT

A brake apparatus for vehicles having a wheel brake on each vehicle wheel, each wheel brake has a brake body non-rotatably connected to the vehicle wheel, a brake actuator that engages the brake body for braking purposes, and a brake anchor plate that contains the brake actuator and is fastened to the chassis. A sensor that is disposed on the brake anchor plate for detecting the wheel brake moment, the sensor is universally usable for various embodiments of the wheel brake and with the least possible alterations to the chassis, the sensor is embodied as a so-called pillow block force transducer that is adapted so that it constitutes at least one fastening element between the brake anchor plate and the chassis.

17 Claims, 5 Drawing Sheets

BRAKE APPARATUS FOR VEHICLES

The invention is based on a brake apparatus for vehicles claim 1 type defined in the preamble to claim 1.

In brake apparatuses for vehicles, the detection of the wheel brake moments in the individual vehicle wheels by means of so-called brake moment sensors is necessary in order to compensate for variances among the wheels during individual wheel braking by means of a brake moment control, as well as in order to be able to exactly adjust individual-wheel brake effects during drive slip control or to be able to detect a locking of the vehicle wheel during antilock brake control (ABS) in conjunction with the friction coefficient slip curve.

In a known brake apparatus of the kind mentioned at the beginning in a slip-controlled brake system (DE 36 00 647 A1), the brake moment sensor that has strain gauges at its disposal is inserted into the power flux of the transfer of force from the shaft to the vehicle wheel, wherein the sensor is embodied as a disk which is screwed to a wheel flange on one side and to a wheel rim on the other. The brake moment measured or an electrical signal that corresponds to the brake moment is output via an inductive transmitter. Alternatively, in the known brake apparatus, the proposal is made to install the brake moment sensor also on the brake anchor plate at a location that is deformed proportional to the brake moment.

ADVANTAGES OF THE INVENTION

The brake apparatus for vehicles according to the invention, has the advantage that the brake moment sensor, without modification, is suited for various embodiments of wheel brakes and can be used to sense brake moment, for example, in both disk brakes and drum brakes. It is small, requires only slight modifications to the chassis or to the brake parts for installation, and can be replaced with no trouble when defective. Since it has no direct access to hot brake parts, it functions reliably and has a long service life.

The force transducer which is used according to the invention as a brake moment sensor and whose function is based on the magneto-electric effect or the press ductor principle, according to which the magnetic properties of particular steel alloys and other metal alloys change with the influence of mechanical forces, is known as a so-called pillow block force transducer, which is used, for example, to control tensile stresses in mill trains. Since the two windings are disposed at right angles to each other, no magnetic coupling is produced between them as long as the metal block is not stressed. If the metal block is stressed, i.e. if a force is applied, then the magnetic field changes in such a way that its permeability decreases in the direction of the force. This leads to an altered symmetry of the power flux, which in turn leads to the fact that a part of the power flux in the secondary winding induces a voltage that is proportional to the load up to a particular load. The shear stress of the force transducer, which functions as a fastening element between the brake anchor plate and the chassis, is detected for the brake moment sensing according to the invention. Since the total volume of the metal block produces the measurement effect, when there is an oblique or uneven introduction of force in contrast to strain gauges, an averaging advantageously occurs.

Advantageous improvements and updates of the brake apparatus disclosed are possible by means of the measures taken hereinafter.

According to one advantageous embodiment of the invention, on each of the side faces that extend parallel to the primary winding and face away from each other, the metal block has a threaded pin protruding from it, which has an internal or external thread. This results in an extremely small force transducer, which must be calibrated, though, since strains are produced in the metal block as a result of its being tightened by way of the threaded pins, which cause an error in the sensor signal.

According to a preferred embodiment of the invention, the metal block is embodied as a double T-shaped in longitudinal section and has a center strut and two lateral struts that are parallel to each other. The two windings that cross each other are disposed in the center strut, which is preferably quadrilateral in cross section and remote from the center strut, the threaded bores are let into each preferably plate-shaped lateral strut, with bore axes parallel to the center strut, for receiving threaded bolts that are fixed on the chassis and brake anchor plate end. With this structural embodiment of the sensor, no influence on the sensor region in the center strut can occur due to the screw connection since the screw connection is carried out at a distance from the crossed windings and the shear force occurring at the force transducer is conducted in a parallel fashion by the two lateral struts.

According to another embodiment of the invention, the metal block is embodied as double π-shaped in longitudinal section and has two parallel center struts spaced apart from each other and two lateral struts that are parallel to each other. A winding pair of the two windings that cross each other is disposed in each center strut with a preferably quadrilateral cross section, and threaded bores are let into each preferably plate-shaped lateral strut, with bore axes parallel to the center strut, for receiving threaded bolts that are fixed on the chassis end and brake anchor plate end, respectively. With this sensor, two force transducers are constituted by the two center struts onto which the shear forces introduced into the sensor are apportioned and which supply the redundant measurement results. This sensor can thus be used with higher safety requirements and for higher forces.

According to an advantageous embodiment of the invention, the threaded bores are contained in strip-like projections that extend along the lateral edges of the plate-shaped lateral struts remote from the center struts and these projections protrude from the lateral struts on sides that face each other, and are disposed opposite each other with a gap space. A tilting of the lateral struts is limited by means of these strip-like projections, which are disposed opposite each other with only a slight gap space.

According to another embodiment of the invention, the two plate-shaped lateral struts are connected to each other on their lateral edges remote from the center struts by means of outer braces, which each protrude beyond the projections and their gap space and are of one piece with the lateral struts and projections. These two outer braces cause the shear forces acting on the sensor to be apportioned onto the center strut and the two outer braces so that higher forces can be transmitted with the sensor.

According to an advantageous embodiment of the invention, the metal block is covered on its top and bottom side, respectively, by an annular disk with an annular width that approximately corresponds to the metal block width. The two annular disks are connected to each other by means of radial struts that are offset from one another by a circumferential angle. The annular disks contain threaded bores for receiving threaded bolts that are fixed on the chassis and brake anchor plate end. This structural embodiment of the sensor is particularly suited for drum brakes and permits a very large transmission of force. For redundant measurement results, it is possible to dispose another metal block with the windings that cross each other between the two annular disks, diametrically opposed to the first metal block.

BRIEF DESCRIPTION OF THE DRAWINGS

The invention will be explained in detail in the description below in conjunction with exemplary embodiments represented in the drawings.

DETAILED DESCRIPTION OF THE EXEMPLARY EMBODIMENTS

Figure 1:
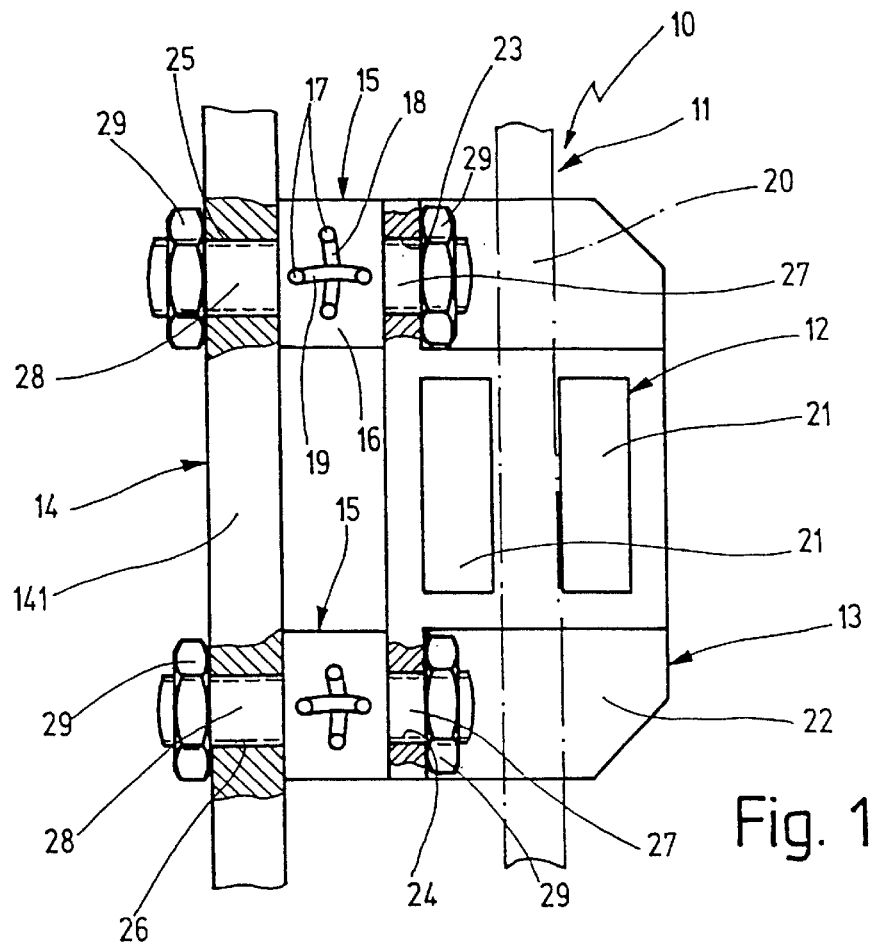
FIGS. 1 to 6 each schematically represent details of a side view of a brake apparatus for vehicles, with a wheel brake embodied as a disk brake, and various embodiments of brake moment sensors, FIG. 7 schematically represents a top view of a brake apparatus for vehicles, with a wheel brake embodied as a drum brake, FIG. 8 schematically represents a side view of the brake apparatus in FIG. 7, FIG. 9 schematically represents a top view of a brake apparatus for vehicles, with a wheel brake embodied as a drum brake, according to another exemplary embodiment, FIG. 10 schematically represents a side view of the brake apparatus in FIG. 9.

The brake apparatuses for vehicles represented in details in FIGS. 1 to 10 have in common the fact that each vehicle wheel is provided with a wheel brake 10, which has a brake body 11 non-rotatably connected to the vehicle wheel, not shown here, a brake actuator 12 for engaging the brake body 11 in order to brake, as well as a brake anchor plate 13 that contains the brake actuator. The brake anchor plate 13 is fastened to the chassis 14, of which a steering knuckle 141 is depicted in FIGS. 1 to 6 and a fastening flange 142 connected to the wheel axle 143 is depicted in FIGS. 7 to 10. At least one brake moment sensor 15 is disposed between the brake anchor plate 13 and the chassis 14 and is embodied as a pillow block force transducer whose function is based on the known press ductor principle, i.e. the magneto-elastic effect, wherein the magnetic properties of particular steel alloys and other metal alloys are influenced by means of external mechanical forces. The force transducer, called the sensor 15 for short below, therefore has a laminated metal block 16 with four through openings 17, which extend parallel to one another, are disposed at the corner points of an imaginary square, and penetrate the metal block 16 parallel to its side faces, and has two windings 18, 19 that are guided through the through openings 17 at right angles to each other. In a laminated metal block 16, the through openings 17 extend crosswise to the laminations. The primary winding 18 is supplied with alternating current and a measurement voltage that is proportional to the power flux can be taken at the secondary winding 19. The force transducer or sensor 15 constitutes at least one fastening element between the brake anchor plate 13 and the chassis 14 by virtue of the fact that on side faces that face opposite directions from each other and extend parallel to the primary winding 18, the metal block 16 is respectively fastened to the chassis 14 and to the brake anchor plate 13. The following steel alloys or metal alloys can be used for the metal block:

18 CrNi 8, 14 CrNi 18 (heat treatable chrome-nickel steels)

50 Fe, 50 Co (Vacuflux)

97 Fe, 3 Si

50 Fe, 50 Ni (also as a sintered metal)

rare earth alloys comprised of Fe with percentages of Tb and Dy

MnZn ferrites and NiZn ferrites.

The final decision for a particular material is a function of the force range to be measured, the sensor dimensions, and the coil dimensioning.

In the wheel brake that is embodied as a disk brake in FIGS. 1 to 6, the brake body 11 is constituted by a brake disk 20, which is indicated with dot-and-dash lines and is non-rotatably connected to the vehicle wheel. The brake actuator 12 has two brake pistons 21, only shown schematically, which press against the brake disk 20 on the left and right sides during braking. The brake anchor plate 13 is embodied as a so-called caliper 22, which contains the brake pistons 21 and two eyes 23, 24 for fastening to similar eyes 25, 26 on the chassis 14, on the steering knuckle 141 in this instance.

In the exemplary embodiment of the brake apparatus in FIG. 1, the caliper 22 is connected to the steering knuckle 141 by means of two sensors 15. Each sensor 15 has two threaded pins 27, 28 with external thread for this purpose, which protrude at right angles from side faces that extend parallel to the primary winding 18 and face away from each other. The threaded pins 27 of the two sensors 15 are slid through the eyes 23, 24 on the caliper 22, while the threaded pins 28 of the two sensors 15 are slid through the eyes 25, 26 in the steering knuckle 141. Nuts 29 are threaded onto the threaded pins 27, 28 so that the two steel blocks 16 of the sensors 15 are pressed on the one hand against the caliper 22 and on the other, against the steering knuckle 141. When braking, the caliper 22 is carried along by the brake disk 20, wherein the force with which the caliper 22 is carried along by the brake disk 20 is proportional to the brake moment. When traveling forward and backward, this force acts as a shear force on the two sensors 15, and an output voltage proportional to this force is taken from each of the secondary windings 19. Instead of an external thread, the two threaded pins 27, 28 of the sensor 15 can also each have an axial, internally threaded bore into which a headed screw is threaded, which has been slid through the associated eye.

With the above-described fastening of the caliper 22 to the chassis 14, the two sensors 15 achieve a redundancy in the brake moment measurement, which is sought for reasons of safety. Alternatively, though, by means of a corresponding design of the windings, the steel material, and the dimensions, one of the two sensors 15 can also be used exclusively for the more precise measurement of the lower partial braking range that is used most often. The other sensor 15 then handles only the measurement in more intense braking actions.

Figure 2:
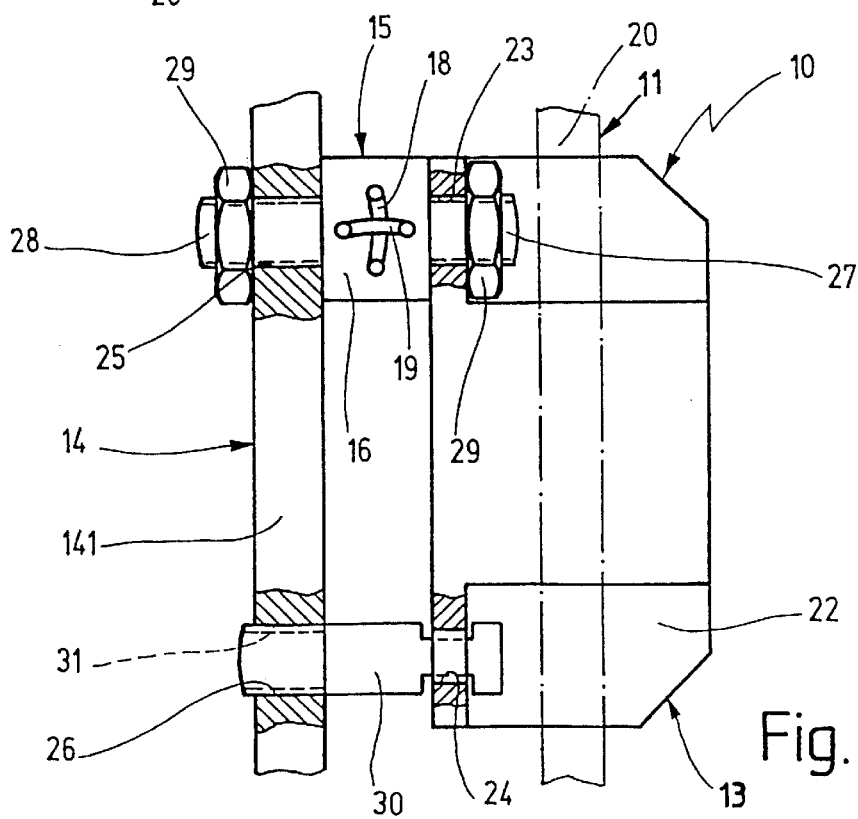

With the braking apparatus represented in FIG. 2, only a single sensor 15 is provided between the caliper 22 and the chassis 14, and this sensor 15 is embodied as in FIG. 1 and is fastened in the eyes 23 and 25 of the caliper 22 or the steering knuckle 141. A stay bolt 30 is screwed into the other eye 26 in the steering knuckle 141, which eye is provided with an internal thread 31, and the stay bolt protrudes with play through the other eye 24 in the caliper 22. The eye 24 is preferably embodied as a longitudinal opening. In this embodiment of the brake apparatus, the entire brake moment is absorbed by the one sensor 15. The stay bolt 30 merely prevents a tilting of the caliper 22. Naturally, it is possible to provide the longitudinal opening guidance of the stay bolt 30 in the steering knuckle 141 and to screw the stay bolt 30 into the eye 24 in the caliper 22, which eye is provided with a corresponding internal thread 31 for this purpose.

Figure 3:
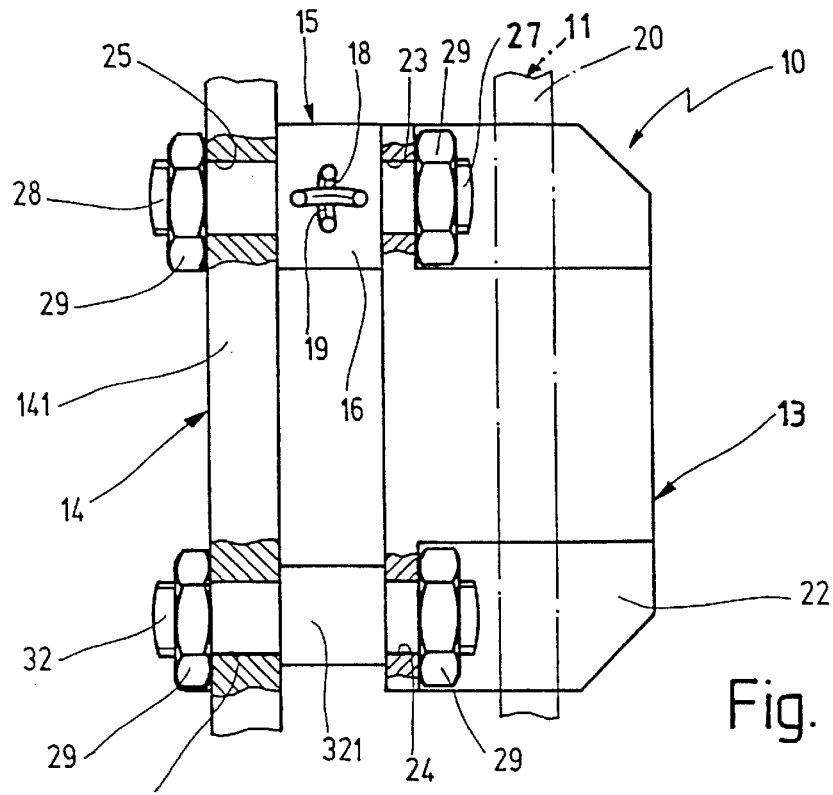

In the exemplary embodiment of the brake apparatus in FIG. 3, on the other hand, only one sensor 15 is provided, which is fastened with its threaded pins 27, 28 by means of the nuts 29 in the eyes 23 and 25 on the caliper 22 or on the steering knuckle 141. The two other eyes 24, 26 on the caliper 22 and the steering knuckle 141, which eyes are flush with each other, are connected to one another by means of a fastening bolt 32. The fastening bolt 32 has a spacer 321, whose axial length corresponds to the width of the metal block 16. The caliper 22 and the steering knuckle 141 are tightened against the spacer 321 by tightening the nuts 33. A force apportionment of the shear force that occurs during braking takes place with this brake apparatus. A brake force apportionment of this kind can be necessary when there are particularly large brake moments, e.g. in trucks. The fastening bolt 32 should be thought of as part of the sensor 15 and must have correspondingly narrow tolerances.

The sensor 15 depicted in FIGS. 1 to 3 does have an extremely low structural volume, but it must be noted that the screw fastening influences the sensor signal; because when screwing it in, strains are produced in the metal block 16 so that a calibration is necessary here. The sensors 15 depicted in FIGS. 4 to 6, though, avoid an influencing of the sensor region by means of the screw fastening on the caliper 22 and the steering knuckle 141.

Figure 4:
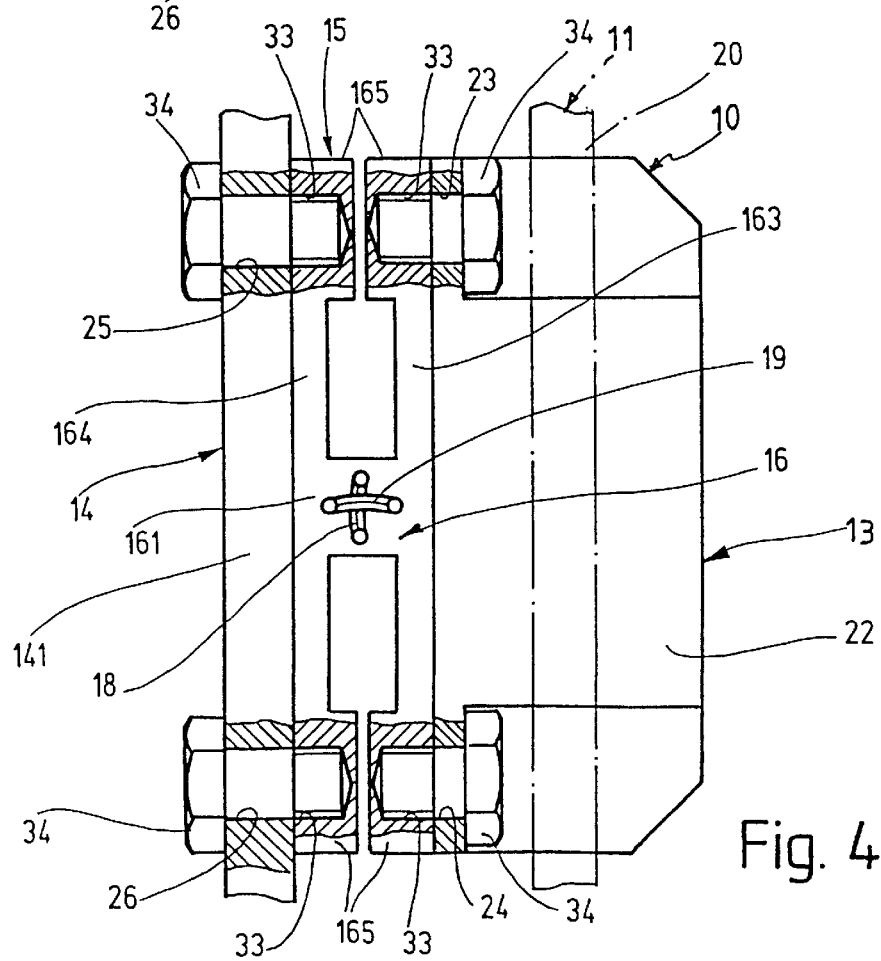

With the sensor 15 depicted in FIG. 4, the metal block 16 is embodied as double T-shaped in longitudinal section and has a center strut 161 and two lateral struts and 164 that are parallel to each other. The center strut 161 constituted by a quadrilateral prism and the lateral struts 163, 165 are constituted by quadrilateral plates connected in one piece to the center strut. The primary winding 18 and the secondary winding 19 are disposed in the center strut 161 and remote from the center strut 161, threaded bores 33 are let into each lateral strut 163, 164, with a bore axis parallel to the center strut 161. The threaded bores 33 are contained in strip-like projections 165 that extend along the lateral edges of the plate-shaped lateral struts 163, 164 remote from the center strut and protrude from the lateral struts 163, 164 on sides that face each other, and are disposed opposite each other with a gap space. Headed screws 34, which are slid through the eyes 23 and 24 on the caliper 22 and through the eyes 25 and 26 on the steering knuckle 141, are screwed into the threaded bores 33 of the sensor 15. As a result, the two plate-shaped lateral struts 163, 164 are attached to the caliper 22 and to the chassis 14, the shear force is conveyed in a parallel fashion by means of the lateral struts 163, 164, and a tilting is limited by means of the two gaps between the projections 34. During braking, the entire brake moment is absorbed by the sensor 15 so that the brake apparatus according to FIG. 4 is comparable in function to the brake apparatus according to FIG. 2, but with the advantage that the screw fastening does not have any influence on the sensor signal.

Figures 5, 6:
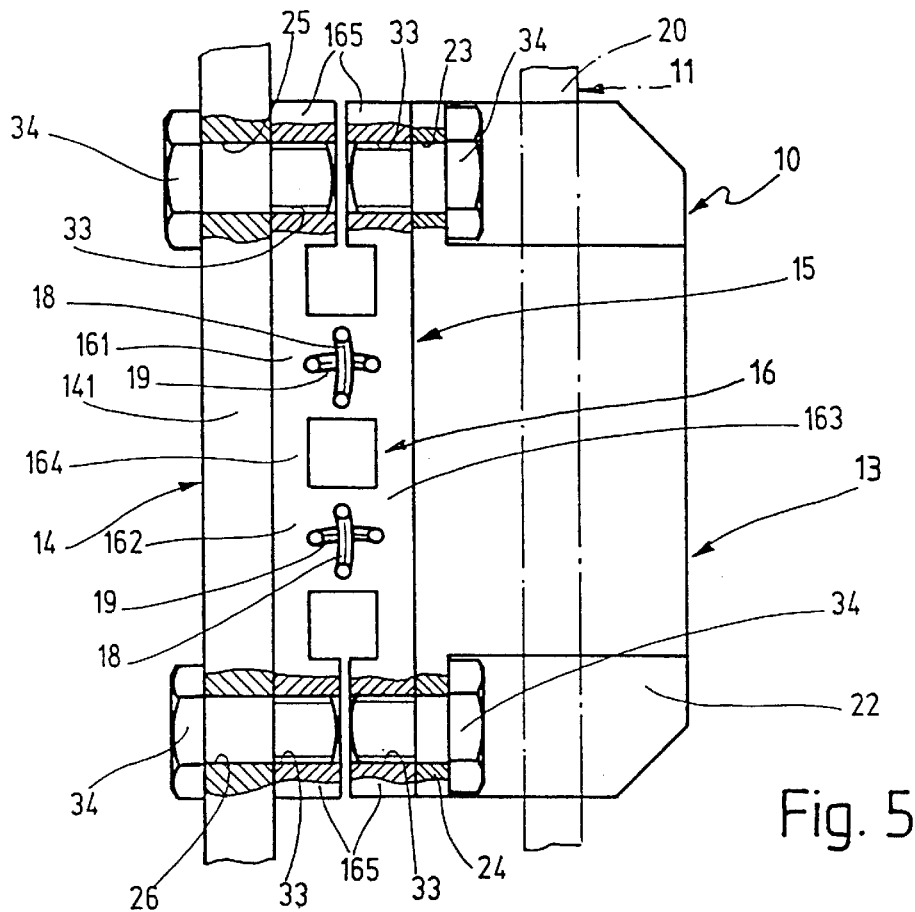

In the exemplary embodiment of the brake apparatus depicted in FIG. 5, the metal block 16 is embodied as double π-shaped in longitudinal section and has two parallel center struts 161, 162 spaced apart from each other and two lateral struts 163 and 164 that are parallel to each other. The center struts 161, 162 are in turn embodied as quadrilateral prisms and the lateral struts 163, 164 are embodied as plates, which are of one piece with the prisms and along their lateral edges, in turn, these plates carry the projections 165 that are disposed opposite each other with a gap space. On the outer end in the region of the strips 165, in turn, four threaded bores 33 are let into the two plate-shaped lateral struts 163, 164. Therefore the sensor 15 according to FIG. 5 corresponds in design to the sensor 15 in FIG. 4 except for the two center struts 161 and 162. A winding pair of the two windings 18, 19 that cross each other is disposed in each center strut 161, 162, wherein for its part, the primary winding 18 is aligned parallel to the lateral struts 163, 164. By means of the two center struts 161, 162, each with two windings 18, 19, two force transducers are realized, so to speak, for measuring shear forces produced when braking. The brake apparatus in FIG. 5 thus corresponds in its function to the brake apparatus depicted in FIG. 1, merely with the difference that the screw connection does not have any influence on the sensor signals.

The sensor 15, which in the brake apparatus according to FIG. 6 fastens the caliper 13 to the steering knuckle 141 of the chassis 14, corresponds in design to the sensor 15 in the brake apparatus according to FIG. 4, with the difference that the two plate-shaped lateral struts 163, 164 are additionally connected to each other along their lateral edges by means of outer braces 166. The braces 166 respectively extend beyond the projections 165 and their gap space and are of one piece with the lateral struts 163, 164 and the projections 165. In this sensor 15, the shear force is apportioned onto the force transducer, i.e. the center strut 161, and the two additional braces 166. The sensor 15 can therefore be used for higher forces. The braces 166 also serve to convey the shear forces in parallel fashion. The sensor 15 can thus be used for large brake moments so that the brake apparatus according to FIG. 6 represents an alternative to the brake apparatus according to FIG. 3.

Figure 7:
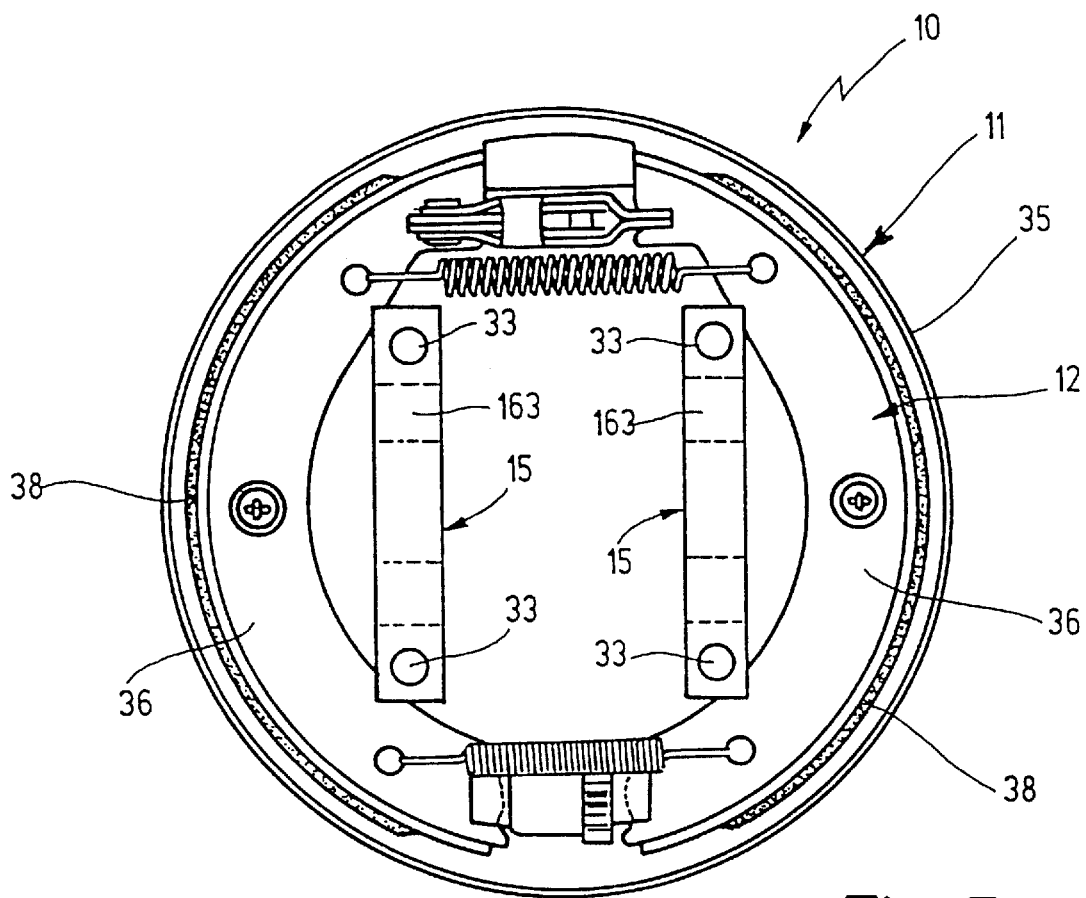
Figure 8:
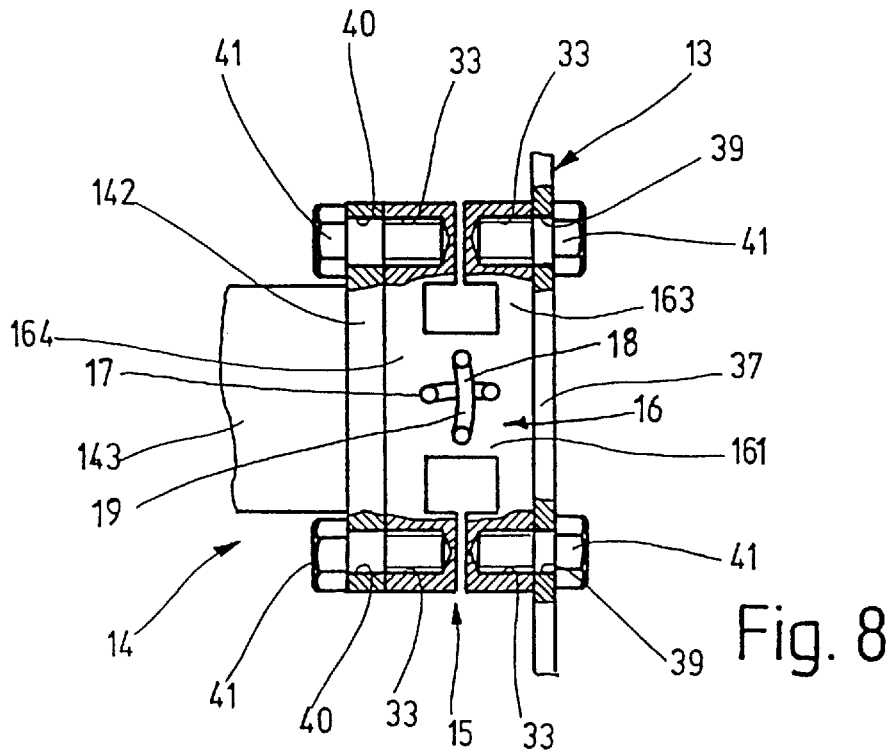
Figure 9:
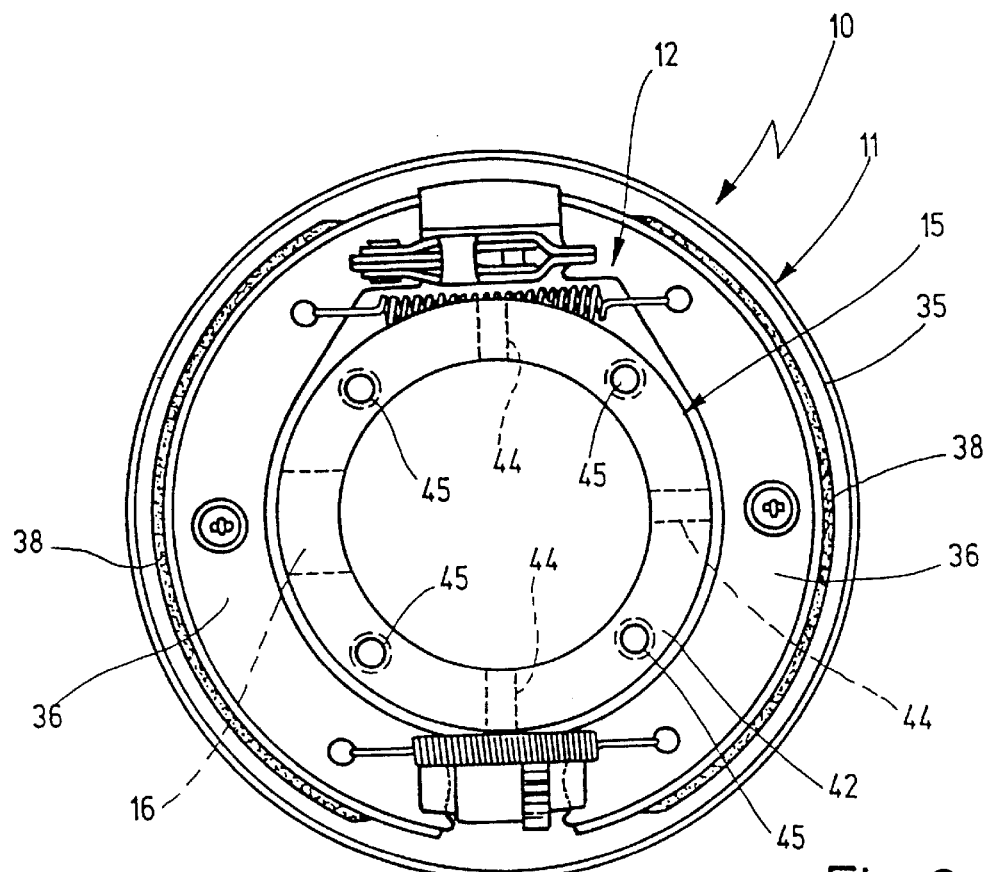

In the brake apparatuses schematically represented in FIGS. 7 to 10, the wheel brake 10 is respectively embodied as a drum brake. The brake body 11 is embodied as a brake drum 35, the brake actuator 12 has two brake shoes 36, and the brake anchor plate 13 is embodied as a securing plate 37 (FIGS. 8 and 10), upon which the two brake shoes 36 are pivotably supported so that when the drum brake is activated, they press against the interior of the brake drum 35 with their brake pads 38. In the depiction of FIGS. 7 and 9, the securing plate 37 is removed for the sake of clarity. The securing plate 37 has four through openings 39 for fastening in relation to the chassis, and for its part, the chassis is provided with a fastening flange 142 that has four corresponding through openings 40 and is fixed to the wheel axle 143 of the chassis 14.

In the brake apparatus according to FIGS. 7 and 8, the securing plate 37 is secured by way of two sensors 15. Each sensor is embodied identically to the sensor 15 depicted in and described in conjunction with FIG. 4. On the securing plate end and the fastening flange end, a headed screw 41 is slid through each of the through openings 39 and the through openings 40, respectively, and is screwed into the threaded bores 33 in the two lateral struts 163, 164 of the metal block 16. The brake apparatus according to FIGS. 7 and 8 is suitable for smaller forces. Since the shear force measurement has very short path, a negligibly small alteration in the force direction occurs due to the brake moment. This effect is taken into account in the calibration of the brake apparatus and is therefore eliminated.

Figure 10:
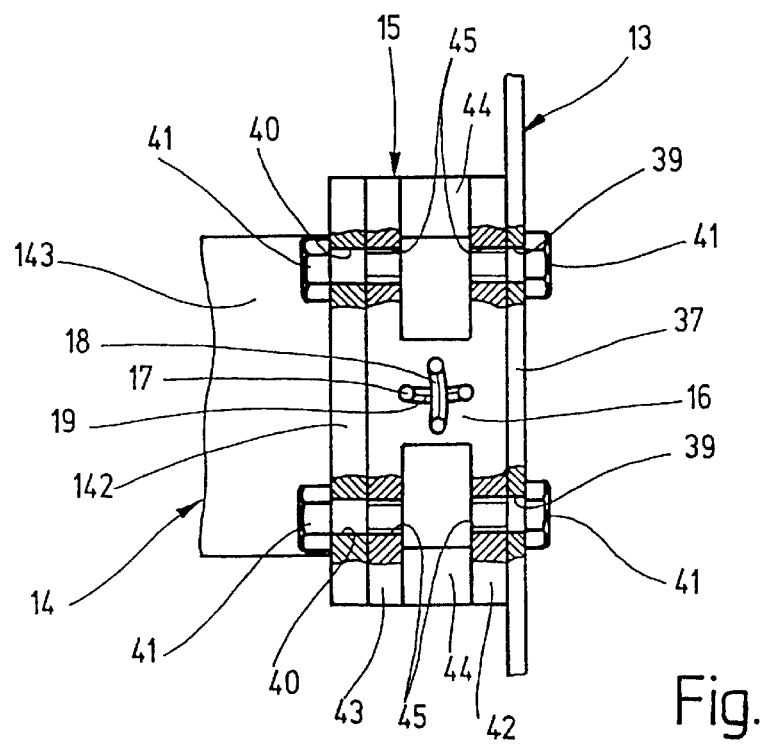

The brake apparatus with a drum brake, which is depicted in FIGS. 9 and 10, is in contrast designed for higher forces, wherein only one sensor 15 is used, i.e. not two redundant sensors 15 as in FIGS. 7 and 8. The sensor 15, which is disposed between the securing plate 37 and the fastening flange 142 and can be seen in a side view in FIG. 10 and in a top view in FIG. 9, is comprised for its part of the metal block 16, which is respectively covered on its top and bottom side by an annular disk 42 and 43. The radial width of the annular disk 42 approximately corresponds to the depth or the width of the metal block 16. The two annular disks 42, 43 are connected to each other by means of three radial struts 44 that are offset from one another and from the metal block 16 by the same circumferential angle. The length of the radial struts 44 corresponds to the annular width. The metal block 16, the annular disks 42, 43, and the radial struts 44 are embodied as being of one piece with one another. In the metal block 16 the two windings 18, 19, which cross each other, are in turn guided through the four through openings 17 in the metal block 16. The two windings 18, 19 are not shown in the top view of the sensor 15 according to FIG. 9 for the sake of clarity. Four threaded bores 45, which are respectively disposed offset from one another by a 90° circumference angle, are let into both annular disks 42, 43, and headed screws 41 are in turn screwed into them. As in the drum brake in FIGS. 7 and 8, the headed screws 41 are slid through corresponding through openings 39 and 40, respectively, in the securing plate 37 and the fastening flange 142. When there are increased safety requirements and in order to produce redundant measurement results, the sensor 15 can be equipped with another force transducer, for example by virtue of the fact that the radial strut 44 disposed diametrically opposite the metal block 16 is replaced by another metal block 16 that has the two crossing windings 18, 19.

The foregoing relates to preferred exemplary embodiments of the invention, it being understood that other variants and embodiments thereof are possible within the spirit and scope of the invention, the latter being defined by the appended claims.

I claim:

1. A brake apparatus for vehicles, comprising a wheel brake (10) on each vehicle wheel, said wheel brake has a brake body (11) non-rotatably connected to the vehicle wheel, a brake actuator (12) that engages the brake body (11) for braking purposes, and a brake anchor plate (13) that contains the brake actuator (12) and is fastened to a chassis (14), a sensor (15) that is disposed on the brake anchor plate (13) for detecting the wheel brake moment, the sensor (15) is a force transducer that uses a magneto-elastic effect, said sensor has a laminated or solid metal block (16) with four through openings (17) that extend parallel to side walls and to each other, said through openings pass through the metal block (16), two windings (18, 19) are guided at right angles to each other through the through openings (17), of which a primary winding (18) is supplied with alternating current and a measurement voltage that is proportional to the power flux in the metal block (16) can be measured at a secondary winding (19), and that the sensor (15) constitutes at least one fastening element between the brake anchor plate (13) and the chassis (14), due to the fact that the metal block (16) is secured respectively to the chassis (14) and the brake anchor plate (13) on side faces that extend parallel to the primary winding (18) and face away from each other.

2. The apparatus according to claim 1, in which on each of the side faces that are directed away from each other, the metal block (16) has a threaded pin (27, 28) that protrudes from the brake anchor plate and has an external or internal thread.

3. The apparatus according to claim 1, in which the metal block (16) is embodied as a double T-shape in longitudinal section and has a center strut (161) that is quadrilateral in cross section and two plate-shaped lateral struts (163, 164) that are parallel to each other, that the primary and secondary windings (18, 19) are disposed in the center strut (161), and that remote from the center strut (161), close to each free end of the lateral struts (163, 164), threaded bores (33) with bore axes parallel to the center strut (161) are let into each lateral strut (163, 164) and these bores are for containing threaded bolts (34) attached on the chassis end or the brake anchor plate end.

4. The apparatus according to claim 1, in which the metal block (16) is embodied as double T-shaped in longitudinal section and has two parallel center struts (161, 162), which have a quadrilateral cross section and are spaced apart from each other, and two plate-shaped lateral struts (163, 164), which are parallel to each other, that a winding pair of the primary and secondary windings (18, 19), which are aligned at right angles to each other, is disposed in each center strut (161, 162), and that remote from the center struts (161, 162), close to each free end of the lateral struts (163, 164), threaded bores (33) with bore axes parallel to the center struts (161, 162) are let into each lateral strut (163, 164), and these bores are for containing threaded bolts (34) attached on the chassis end or the brake anchor plate end.

5. The apparatus according to claim 4, in which the threaded bores (33) are contained in strip-like projections (165) that extend along the lateral edges of the plate-shaped lateral struts (163, 164) remote from the center struts and protrude from the lateral struts on sides that face each other, and are disposed opposite each other with a gap space.

6. The apparatus according to claim 5, in which the two plate-shaped lateral struts (163, 164) are connected to each other on their lateral edges remote from the center struts by means of outer braces (166), in which each extend beyond the projections (165) and their gap space, and are of one piece with the lateral struts (163, 164) and the projections (165).

7. The apparatus according to claim 1, in which metal block (16) is respectively covered on a top and a bottom side by an annular disk (42, 43) with a radial width that approximately corresponds to the width of the metal block, that the two annular disks (42, 43) are connected to each other by means of radial struts (44), which are offset from one another by a circumferential angle and whose length corresponds to the annular width, that contain threaded bores (33), which are offset from one another by the same circumference angle and are for containing threaded bolts (41) fixed on the chassis end and the brake anchor plate end, are let into both annular disks (42, 43), and that the metal block (16), the annular disks (42, 43), and the radial struts (44) are embodied as being of one piece with one another.

8. The apparatus according to claim 2, in which for a wheel brake (10) embodied as a disk brake, the brake body (11) is a brake disk (20), the brake actuator (12) has at least one brake piston (21), and the brake anchor plate (13) is embodied as a caliper (22), which has two eyes (23, 24) for fastening to similar eyes (25, 26) embodied on the chassis (14), in which the threaded pins (27, 28) of two sensors (15) are each secured by means of nuts (29) or screws in two eyes (23, 24 or 25, 26) that are flush with each other and are disposed on the caliper end and the chassis end, or that the threaded pins (27, 28) of the sensor (15) are secured by means of nuts (29) or screws in two eyes (23 or 25) that are flush with each other and are disposed on the caliper end and the chassis end and the two other eyes (24, 26) that are flush with each other and are disposed on the caliper end and the chassis end are connected to each other rigidly by means of a fastening bolt (32) or are connected to each other in floating fashion by means of a stay bolt (30), by virtue of the fact that the stay bolt (30) is secured in the one eye (26) and protrudes with play into the other eye (24), which is preferably embodied as a longitudinal opening.

9. The apparatus according to claim 3, in which a wheel brake (10) that is embodied as a disk brake, the brake body (11) is a brake disk (20), the brake actuator (12) has at least one brake piston (21), and the brake anchor plate (13) is embodied as a caliper (22), which has two eyes (23, 24) for fastening to similar eyes (25, 26) embodied on the chassis (14), in which a headed screw (34) is slid through each eye (23 to 26) on the caliper end and on the chassis end and is screwed into threaded bores (33) in the metal block (16) of the sensor (15).

10. The apparatus according to claim 3, in which for a wheel brake (10) that is embodied as a drum brake, the brake body (11) is a brake drum (35), the brake actuator (12) has two brake shoes (36), and the brake anchor plate (13) is embodied as a securing plate (37), which carries the two brake shoes (36) in a pivotable fashion and has through openings (39) for fastening to a fastening flange (142) disposed on the chassis end, in which headed screws (41) are respectively slid through the through openings (39) in the securing plate (37) and similar through openings (40) in the fastening flange (142) of the chassis (14) and are screwed into threaded bores (33) in the metal blocks (16) of two sensors (15) disposed in diametrical opposition relative to the brake drum axis.

11. The apparatus according to claim 7, in which for a wheel brake (10) that is embodied as a drum brake, the brake body (11) is a brake drum (35), the brake actuator (12) has two brake shoes (36), and the brake anchor plate (13) is embodied as a securing plate (37), which carries the two brake shoes (36) in a pivotable fashion and has through openings (39) for fastening to a fastening flange (42) disposed on the chassis end, in which headed screws (41) are respectively slid through the through openings (39) in the securing plate (37) and similar through openings (40) in the fastening flange (42) of the chassis (14) and are screwed into the threaded bores (33) in the annular disks (42, 43) of the sensor (15).

12. The apparatus according to claim 4, for a wheel brake (10) that is embodied as a disk brake in which the brake body (11) is a brake disk (20), the brake actuator (12) has at least one brake piston (21), and the brake anchor plate (13) is embodied as a caliper (22), which has two eyes (23, 24) for fastening to similar eyes (25, 26) embodied on the chassis (14), in which a headed screw (34) is slid through each eye (23 to 26) on the caliper end and on the chassis end and is screwed into threaded bores (33) in the metal block (16) of the sensor (15).

13. The apparatus according to claim 4, for a wheel brake (10) that is embodied as a drum brake, in which the brake body (11) is a brake drum (35), the brake actuator (12) has two brake shoes (36), and the brake anchor plate (13) is embodied as a securing plate (37), which carries the two brake shoes (36) in a pivotable fashion and has through openings (39) for fastening to a fastening flange (142) disposed on the chassis end, in which headed screws (41) are respectively slid through the through openings (39) in the securing plate (37) and similar through openings (40) in the fastening flange (142) of the chassis (14) and are screwed into threaded bores (33) in the metal blocks (16) of two sensors (15) disposed in diametrical opposition relative to the brake drum axis.

14. The apparatus according to claim 5, for a wheel brake (10) that is embodied as a disk brake in which the brake body (11) is a brake disk (20), the brake actuator (12) has at least one brake piston (21), and the brake anchor plate (13) is embodied as a caliper (22), which has two eyes (23, 24) for fastening to similar eyes (25, 26) embodied on the chassis (14), in which a headed screw (34) is slid through each eye (23 to 26) on the caliper end and on the chassis end and is screwed into threaded bores (33) in the metal block (16) of the sensor (15).

15. The apparatus according to claim 5, for a wheel brake (10) that is embodied as a drum brake, in which the brake body (11) is a brake drum (35), the brake actuator (12) has two brake shoes (36), and the brake anchor plate (13) is embodied as a securing plate (37), which carries the two brake shoes (36) in a pivotable fashion and has through openings (39) for fastening to a fastening flange (142) disposed on the chassis end, in which headed screws (41) are respectively slid through the through openings (39) in the securing plate (37) and similar through openings (40) in the fastening flange (142) of the chassis (14) and are screwed into threaded bores (33) in the metal blocks (16) of two sensors (15) disposed in diametrical opposition relative to the brake drum axis.

16. The apparatus according to claim 6, for a wheel brake (10) that is embodied as a disk brake in which the brake body (11) is a brake disk (20), the brake actuator (12) has at least one brake piston (21), and the brake anchor plate (13) is embodied as a caliper (22), which has two eyes (23, 24) for fastening to similar eyes (25, 26) embodied on the chassis (14), in which a headed screw (34) is slid through each eye (23 to 26) on the caliper end and on the chassis end and is screwed into threaded bores (33) in the metal block (16) of the sensor (15).

17. The apparatus according to claim 6, for a wheel brake (10) that is embodied as a drum brake, in which the brake body (11) is a brake drum (35), the brake actuator (12) has two brake shoes (36), and the brake anchor plate (13) is embodied as a securing plate (37), which carries the two brake shoes (36) in a pivotable fashion and has through openings (39) for fastening to a fastening flange (142) disposed on the chassis end, in which headed screws (41) are respectively slid through the through openings (39) in the securing plate (37) and similar through openings (40) in the fastening flange (142) of the chassis (14) and are screwed into threaded bores (33) in the metal blocks (16) of two sensors (15) disposed in diametrical opposition relative to the brake drum axis.

* * * * *